United States Patent [19]
Kamezawa

[11] Patent Number: 5,490,660
[45] Date of Patent: Feb. 13, 1996

[54] MANUAL DEVICE FOR VALVE

[75] Inventor: Jiro Kamezawa, Osaka, Japan

[73] Assignee: Tomoe Technical Research Company, Osaka, Japan

[21] Appl. No.: 373,971

[22] Filed: Jan. 17, 1995

[30] Foreign Application Priority Data

Feb. 9, 1994 [JP] Japan .................................. 6-036639

[51] Int. Cl.⁶ .................................................. F16K 35/02
[52] U.S. Cl. ................................ 251/96; 74/548; 74/552; 74/554
[58] Field of Search ........................... 74/25, 111, 548, 74/552, 553, 554, 575; 251/95, 96, 100, 229, 230; 192/67 R, 95; 403/1

[56] References Cited

U.S. PATENT DOCUMENTS

| | | | |
|---|---|---|---|
| 1,716,277 | 6/1929 | Messmer | 251/96 |
| 1,933,177 | 10/1933 | Kindl | 251/96 |
| 2,044,254 | 6/1936 | Mueller | 251/96 |
| 2,064,623 | 12/1936 | Mueller | 251/96 |
| 2,089,617 | 8/1937 | Mueller | 251/96 |
| 2,194,714 | 3/1940 | Mueller | 251/96 |
| 2,501,008 | 3/1950 | Schramm | 74/548 |
| 2,780,333 | 2/1957 | Reiser et al. | 74/548 X |
| 2,797,592 | 7/1957 | Marrapese | 74/548 |
| 2,829,538 | 4/1958 | Mueller | 74/548 |
| 2,899,841 | 8/1959 | Melloy | 74/548 |
| 3,001,551 | 9/1961 | Wyser | 251/96 |
| 3,193,243 | 7/1965 | Billington et al. | 251/96 |
| 3,210,040 | 10/1965 | Thurlow | 251/96 |
| 4,549,716 | 10/1985 | Warren | 251/96 |
| 5,037,066 | 8/1991 | Kerger et al. | 251/96 |
| 5,265,846 | 11/1993 | Shreve | 251/188 |

FOREIGN PATENT DOCUMENTS

| | | | |
|---|---|---|---|
| 777065 | 2/1935 | France | F16K 35/02 |
| 2651297 | 3/1991 | France | F16K 35/00 |

Primary Examiner—George L. Walton
Attorney, Agent, or Firm—Ronald R. Snider

[57] ABSTRACT

A manual device for a valve has: a movable valve opening member sustained rotatably and disposed in a valve body; an opening and closing of the valve for controlling the opening and closing oi a fluid passage; a notch plate connected with one end of a stem which is pivotably sustaining the valve; a notch plate moving freely in axial direction on the stem and which rotates synchronously with the stem; a manual and oprative knob adhered to the notch plate; a casing adhered to the valve body, so that the casing stores the notch plate and guides the movement of the notch plate freely in the axial direction and guides rotation of the notch plate; a notch means preventing the extra rotation of the notch plate by mutual engagement between the notch plate and the casing; and a notch plate which is constantly pressurized to keep the engagement. This invention provides a manual device, wherein the maximum or minimum or intermediate degree of opening of the valve can be maintained, and at the same time, the device also achieves simple construction, long life and down sizing.

6 Claims, 14 Drawing Sheets

MANUAL DEVICE FOR VALVE

BACKGROUND OF THE INVENTION

This invention relates to an operative device for a valve controlled by human hands, and more particularly relates to the device for a model in which an opening and a closing of the valve are arranged by rotating the valve body.

In prior art, valves have been well known such as butterfly valves, ball valves, cocks and so on, where a rotation of the valve is adapted to open or close a flow passage and is adapted to control various kinds of fluid flows. Among these rotating valves, a valve having a small diameter is often equipped witfh manual operation by means of an operative lever or the like which is built at the outer end of an extending stem.

Ball valves or cocks are so well restrained by the given pressure of a valve seat that an opening angle or degree is never influenced by changes of fluid pressure or changes of fluid speed. Therefore, for this kind of valve, it is not necessary to prepare an extra means of manual operative lever at the intermediate opening degree.

On the other hand, for butterfly valves, the valve body is not strained properly on account of their constructions, so that some unblanced torque may be imposed because of the changes of fluid pressures or the changes of fluid speed, and thus the opening degree is badly influenced. Accordingly, it is necessary to fix some extra means of manual operative lever thereagainst. For example, a plate with a notch is formed, while a projection is also formed on the top end of the lever to engage with the notch correctly. Or else, an extra screw is fastened to the lever, so that the lever may not move unexpectedly.

For rotating valves, the amount of rotation is usually set at a 90 degree angle, and a stopper is provided to prevent overrun of the opening position and also to control the minimum or maximum opening position.

The notch, screw and stopper are positioned at the outside surface of the operative device, and therefore these portions are easily deformed or broken with an outer shock or accidental blow. Sometimes, the engagement between the notch and the projection is disconnected to result into erroneous operation. Especially for the lever, it largely stands extending toward the outside, which invites the contact of workers in the factory, where the lever is wrongly operated to change the opening degree.

SUMMARY OF THE INVENTION

This invention has an object to provide a valve opening member for a valve, wherein the keeping of the desirable valve opening degree can be obtained easily and firmly at any position of the valve opening member, such as the minimum or maximum or intermediate point, and any projection or notch is eliminated from the outside of the device to ensure the safety of operation procedures. Moreover, the long life of the device as well as the down sizing is also achieved.

In order to fullfill the present object, the inventor has adopted the following means. A valve, including a valve opening member pivoted rotatably in a valve body and where rotation of the valve opening member is adapted to open or close the valve at one end of a stem sustaining the valve opening member. A notch plate having plural notches which is connected to the end of the stem, where the notch plate moves freely in axial direction along the stem and rotates synchronously with the stem. A manual and operative knob which is adhered to the notch plate, and a casing which contains the notch plate which is also adhered to the valve body to guide the movement and rotation of the notch plate. Another notching means is also provided in order to prevent the free rotation of the notch plate by engaging the notch plate with the casing. Both the notch plate and the notch means are constantly pressed together to ensure the mutual engagement therebetween.

In order to prevent overrun of the rotation beyond the fixed degree, a stopper and a stopper receiver contacting each other are iormed on the notch plate and the casing.

Each notch comprises a tooth-like convex shape and a concave ditch with rectangular section, and both sides of the convex shape are tapered toward its top, while the width of the top is exactly same as that of the bottom prepared in the ditch. The notch plate has a disk shape, plural notches are established at equal spaces on its circular surface, and they extend radially toward the outside from the center of the circle.

A pressurizing means for the notch plate comrpises a coiled spring.

The valve is a butterfly valve consisting of a valve body in which a cylindrical flow passage is drilled, a disk valve opening member pivoted rotatably in the valve body, and an elastic seated ring inserted between the valve body and the valve opening member.

When the present device is adopted, the following result is obtained: When the knob is pushed down, the notch plate is driven to shift along in the axial direction, and then the engagement between the notch plate and the notch means in the casing is released. Then the notch plate is freely rotated. The rotation of the knob rotates the stem which is connected with the knob via the notch plate, and finally it rotates the valve body ior the required degree or for a desirable and regulating position. The notch plate is pre-arranged to prevent its overrun by proper contact between the stopper and the stopper receiver, whereby the position of maximum opening degree or closing degree can be decided. When the force pushing down the knob is released, the notch plate elevates by power of the spring to invite the engagement between the notch plate and the notch means prepared in the casing. Thus the rotation is prevented, and the opening degree is maintained.

According to the prsent invention, a simple structure and down sizing can be achieved, and moreover a self-lock function can be also attained. This function ensures steady maintenance of the desirable valve opening degree. The device is built in the casing, and portions like the notch, screw, stopper and etc. do not project outsider whereby no erroneous operation can be caused by workers or other people.

DETAILED DESCRIPTION OF THE PREFERRED EMBODIMENT

In accordance with attached drawings, the preferred embodiment is now explained. The present embodiment shows a butterfly valve, but the present invention is applicable also for other valves such as ball valves, cocks and etc., where the valves are in the model to rotate the valve body.

Numeral 1 indicates a butterfly valve which comprises a disk-like valve (3) pivoted rotatably in a cylindrical flow passage formed inside a valve body (2) adapted to open or close the flow passage and adapted to control the fluid flow by contacting or detaching from a seated ring (4), and this seated ring (4) is made irom an elastic sealing material and it is equipped within the inner circumferential suriace of the valve body (2). One end of a stem (5) pivotal to the valve (3) extends outside through a shaft (6), and an operative device (8) is connected with an outer end of the stem (5). A clamping plate (7) is preprated on the top end of a shaft (6), and on the plate (7), the operative device (8) is adhered by a bolt (9).

The operative device (8) has a notch plate (10) which rotates synchronously with an outer end of the stem (5) and moves freely in axial direction. On the center surface below the notch plate (10), a boss portion (11) is built, while on the opposite side above the plate (10) a cylindrical arbor portion (12) is built, and both of them become an integral body of the plate (10). A blind aperture (13) is drilled beneath the boss portion (11) for receiving the stem (5), and thus the stem (5) is inserted into the aperture (13) for connection. At least, one face of the aperture (13) or preferrably opposing two faces are formed as a flat surface, and when the stem (5) is inserted for fitting, the flat surface contacts tightly with the stem (5) and thus this fitting spot rotates toward the same direction while the stem (5) moves freely in the axial direction. The coupling between the stem (5) and the aperture (13) is not limited with the present engagement. For example, in order to attain this engagement, serration mechanism or coupling mechanism by a key and key ditch can be also applicable. At the top end of the cylindrical arbor portion (12), a knob (14) is adhered and fixed by a pin (19) to control the rotation.

Figure 7:
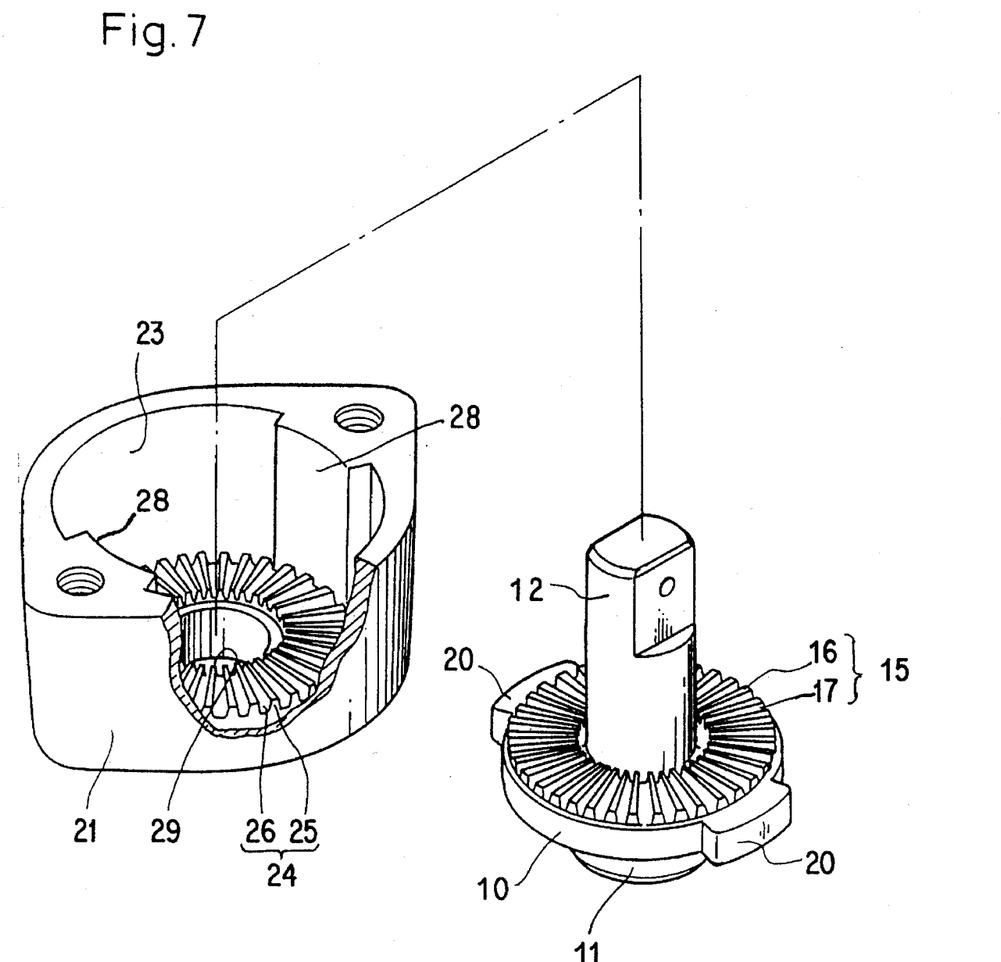
FIG. 7 is a perspective view of a notch plate and a casing.
Figure 8:
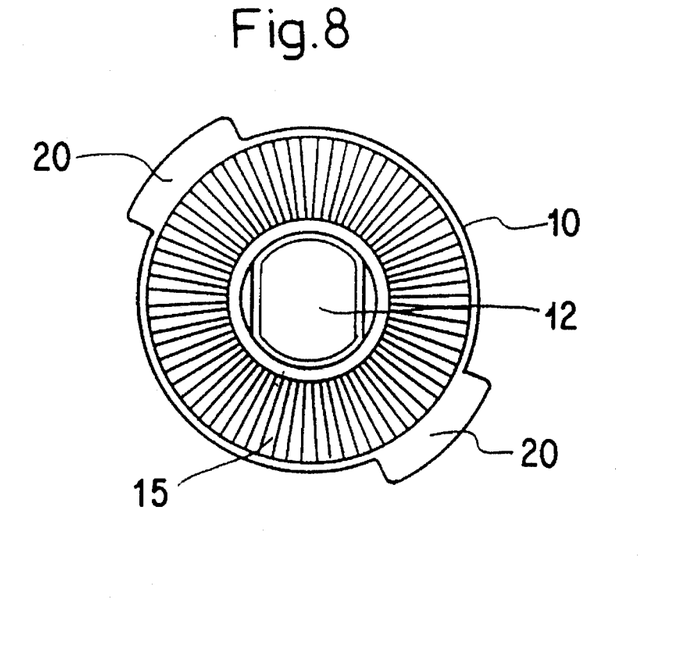
FIG. 8 is a plan view of the notch plate.
Figure 9:
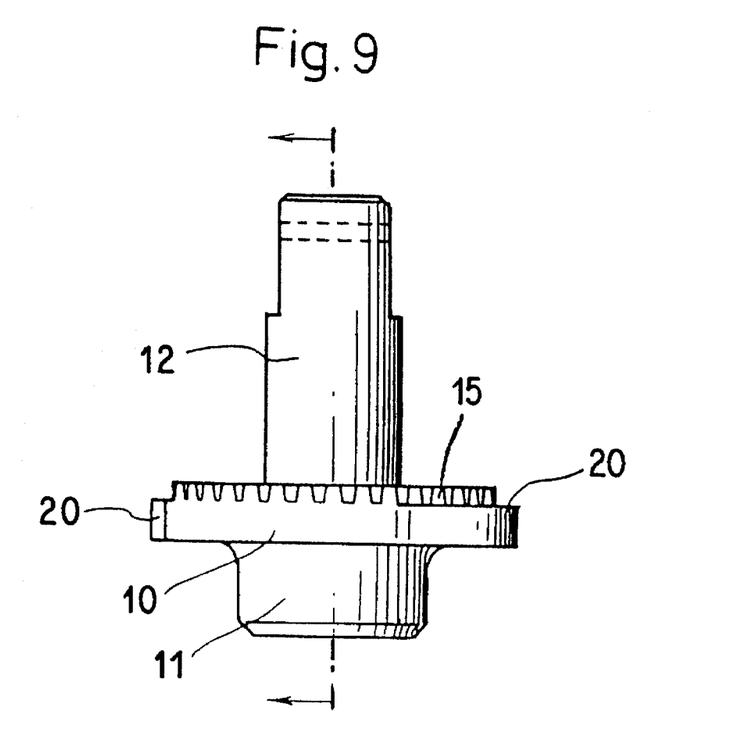
FIG. 9 is a front view of the notch plate.
Figure 10:
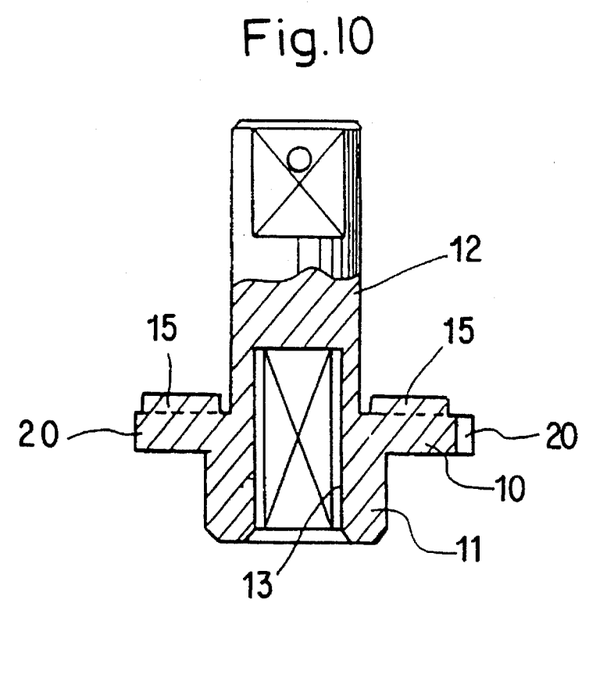
FIG. 10 is a partly sctional view of the notch plate.
Figure 15:
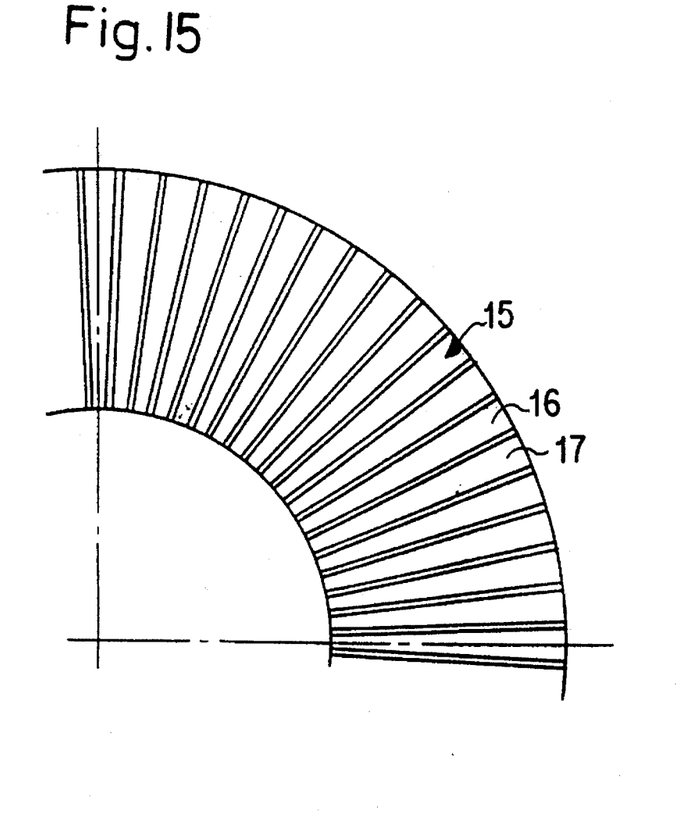
FIG. 15 is a plan view of a operative notch.
Figure 16:
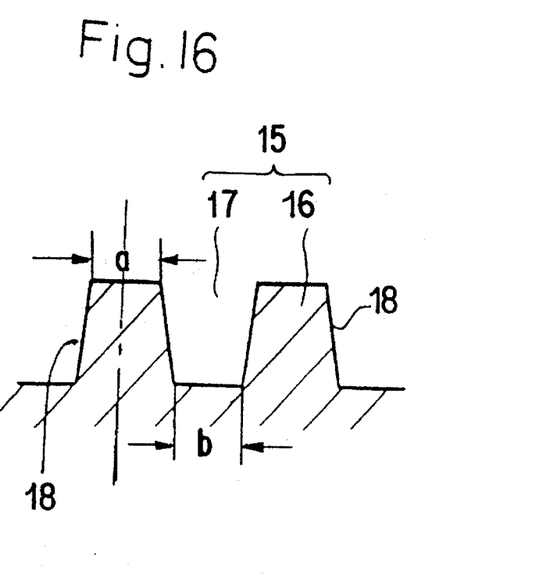
FIG. 16 is a sectional view of the operative notch.

With reference to FIG. 7 and FIG. 8, the notch plate (10) is a disk-like form, and an operative notch (15) is established thereupon, and this notch (15) should engage with a iixed notch (24) prepared in the casing (24). As shown in FIG. 15 and FIG. 16, the operative notch (15) comprises a tooth-like convex (16) and a concaveditch (17), both of which are extending radially toward outside from the center of the notch plate (10), and the notch (15) is formed all over the circumferential surface at equal spaces therebetween. Both side faces (18) of the tooth-like convex (16) are tapered, and the width (a) of the top surface is formed in the same size with the width (b) of the bottom surface of the concave ditch (17).

Figure 11:
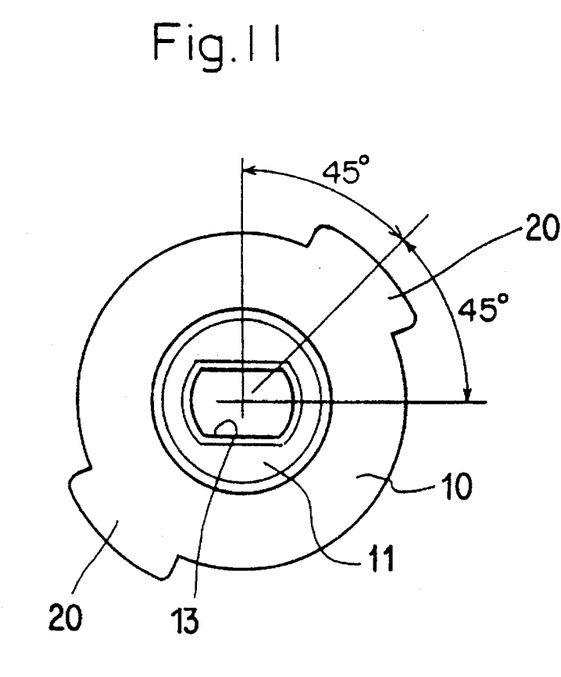
FIG. 11 is a plan view showing the position of a stopper used in the device.

As shown in FIG. 11, on the outer and round circumferential surface of the notch plate (10), a stopper (20) is built in the opposite position against two plane surfaces of the aperture (13).

Figure 4:
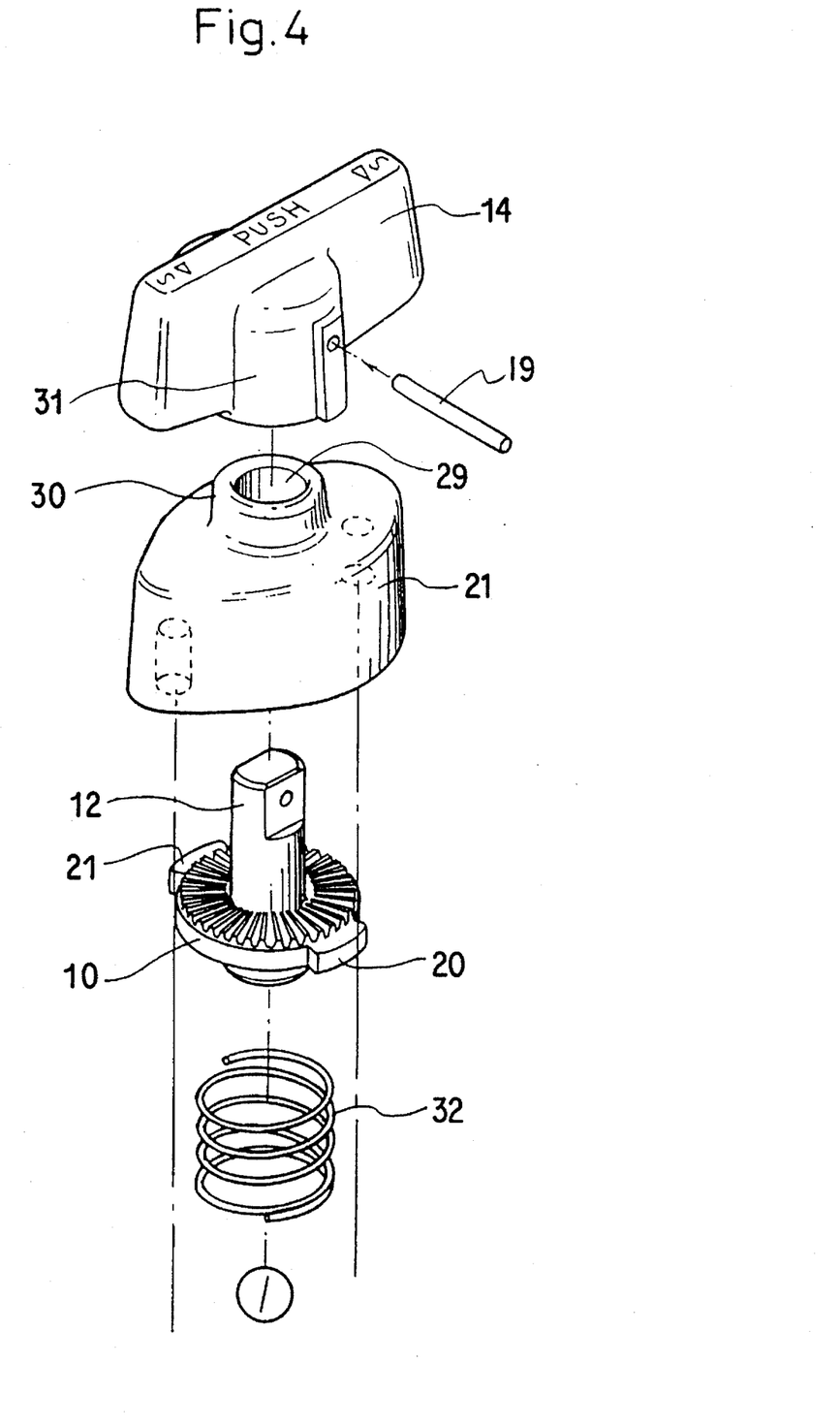
FIG. 4 is an exploded perspective view of upper portions of the device.
Figure 5:
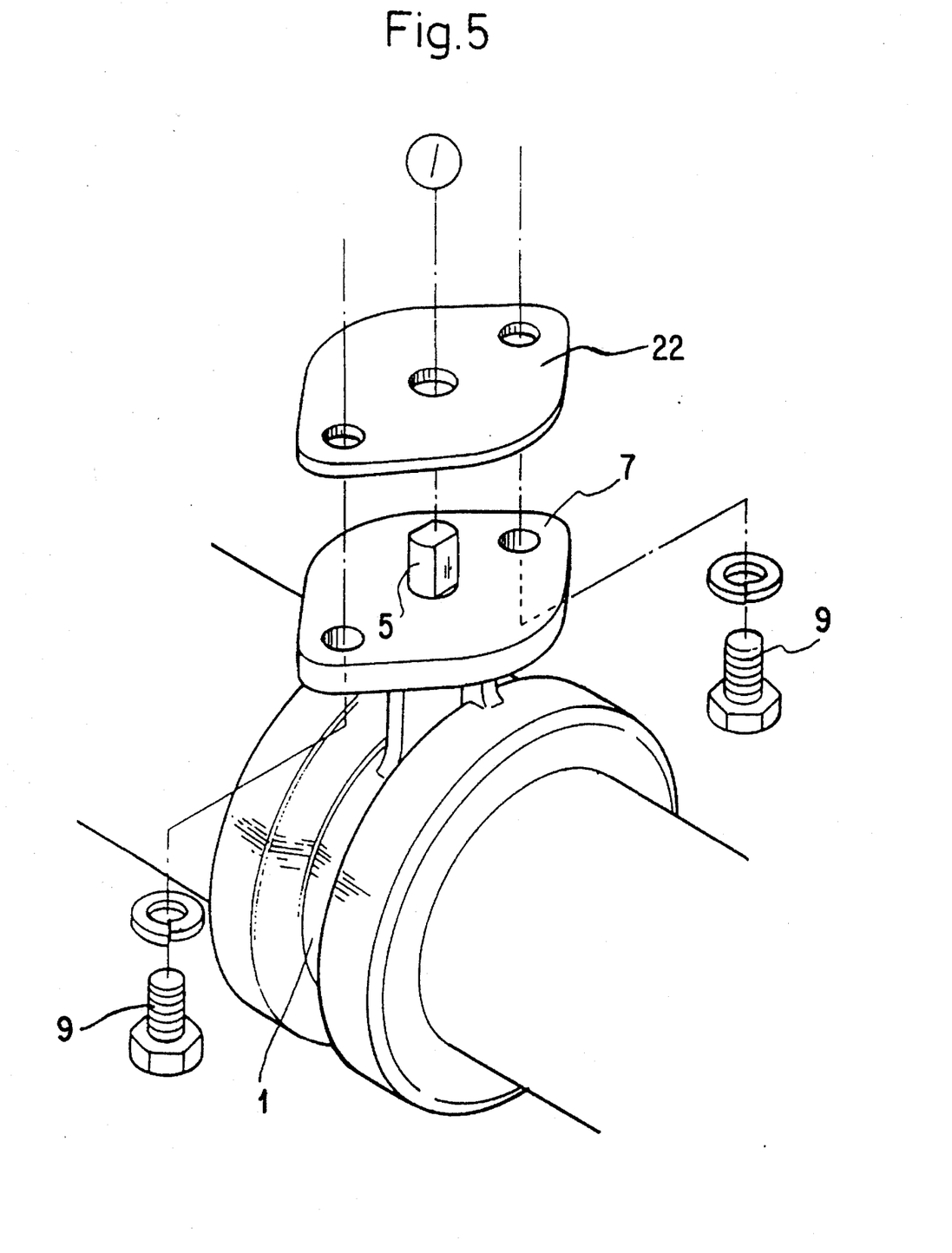
FIG. 5 is an exploded perspective view of lower portions of the device.
Figure 6:
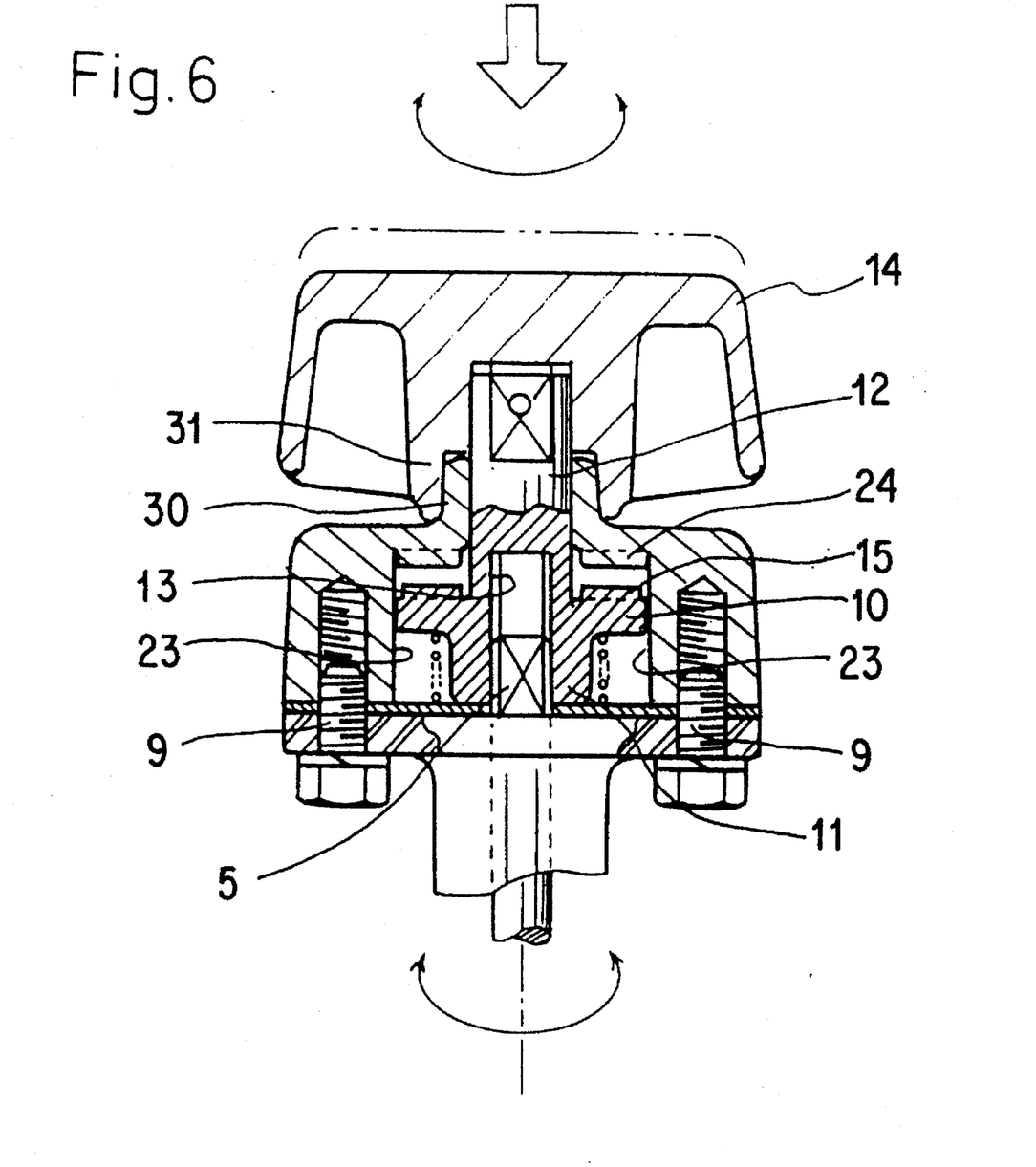
FIG. 6 is a partly cross-sectional view of the device where the lock is released.
Figure 17:
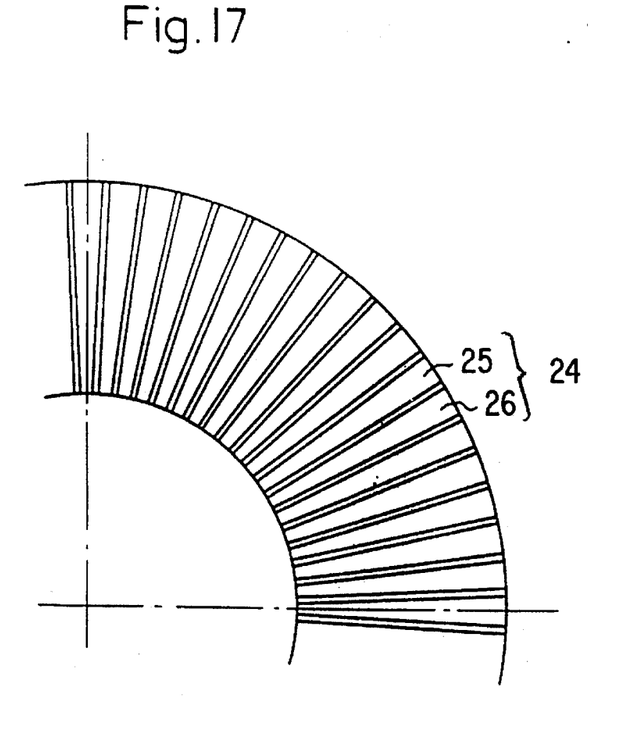
FIG. 17 is a plan view of a fixed notch.
Figure 18:
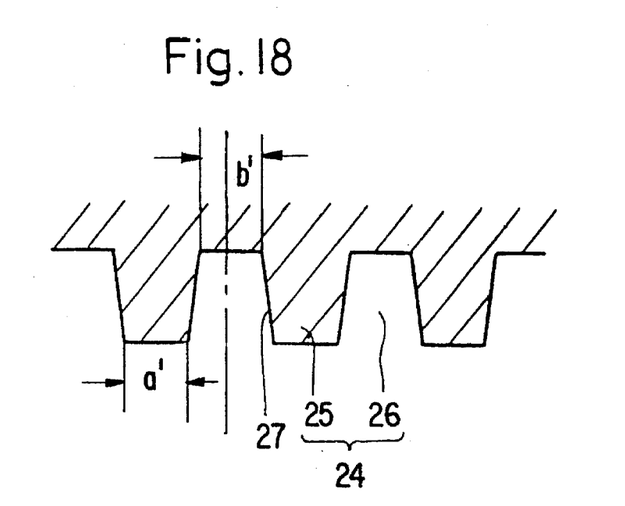
FIG. 18 is a sectional view of the fixed notch.

With reference to FIG. 4, 5 and 6, numeral 21 shows the casing containing the notch plate (10). This casing (21) has an open bottom, and it is clamped to the upper surface of the clamping plate (7) via a washer plate (22) with a bolt (9). In the inside of the casing (21), a central aperture (23) in cylindrical form is formed to rotate the notch plate (10) freely, and this central aperture (23) has enough height for the notch plate (10) to move up and down in the axial direction. On the upper surface of the central aperture (23), the fixed notch (24) is prepared, so that it can engage with the operative notch (15) prepared on the notch plate (10). As shown in FIG. 17 and FIG. 18, this fixed notch (24), similar to the operative notch (15), comprises an tooth-like convex (25) and a concave ditch (26), both of which are extending radially toward outside from the center, and each notch (24) is formed all over the circumferential surface at equal spaces therebetween. Both side faces (27) of the tooth-like convex (25) are tapered, and width (a') of the top surface is formed in the same size with the width (b') of the bottom surface of the concave ditch (26). The fixed notch (24) is adapted to engage correctly with the operative notch (15).

Figure 12:
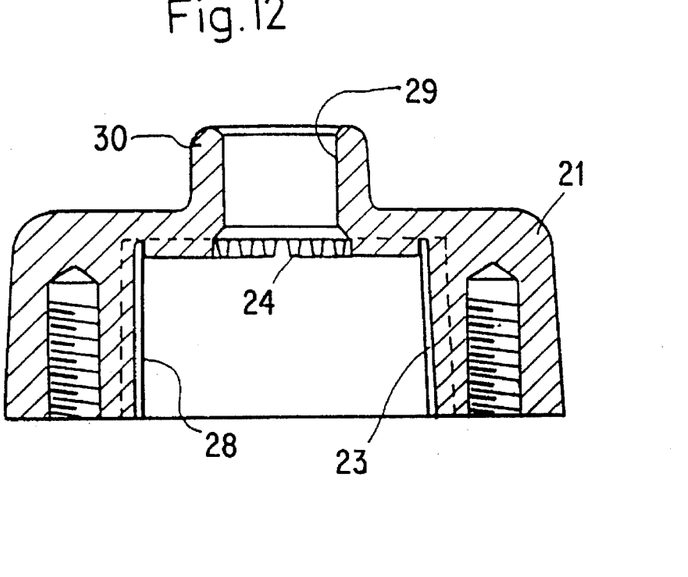
FIG. 12 is a sectional view of the casing.
Figure 13:
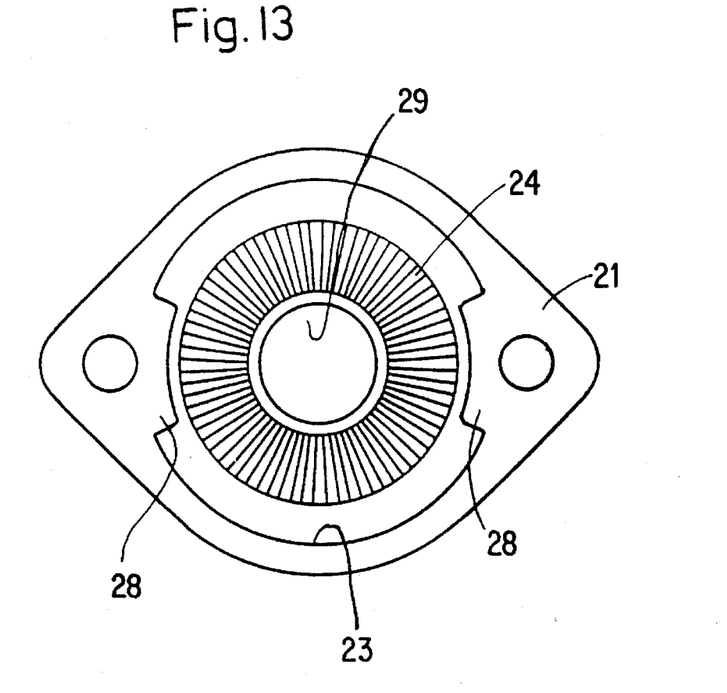
FIG. 13 is a bottom view of the casing.
Figure 14:
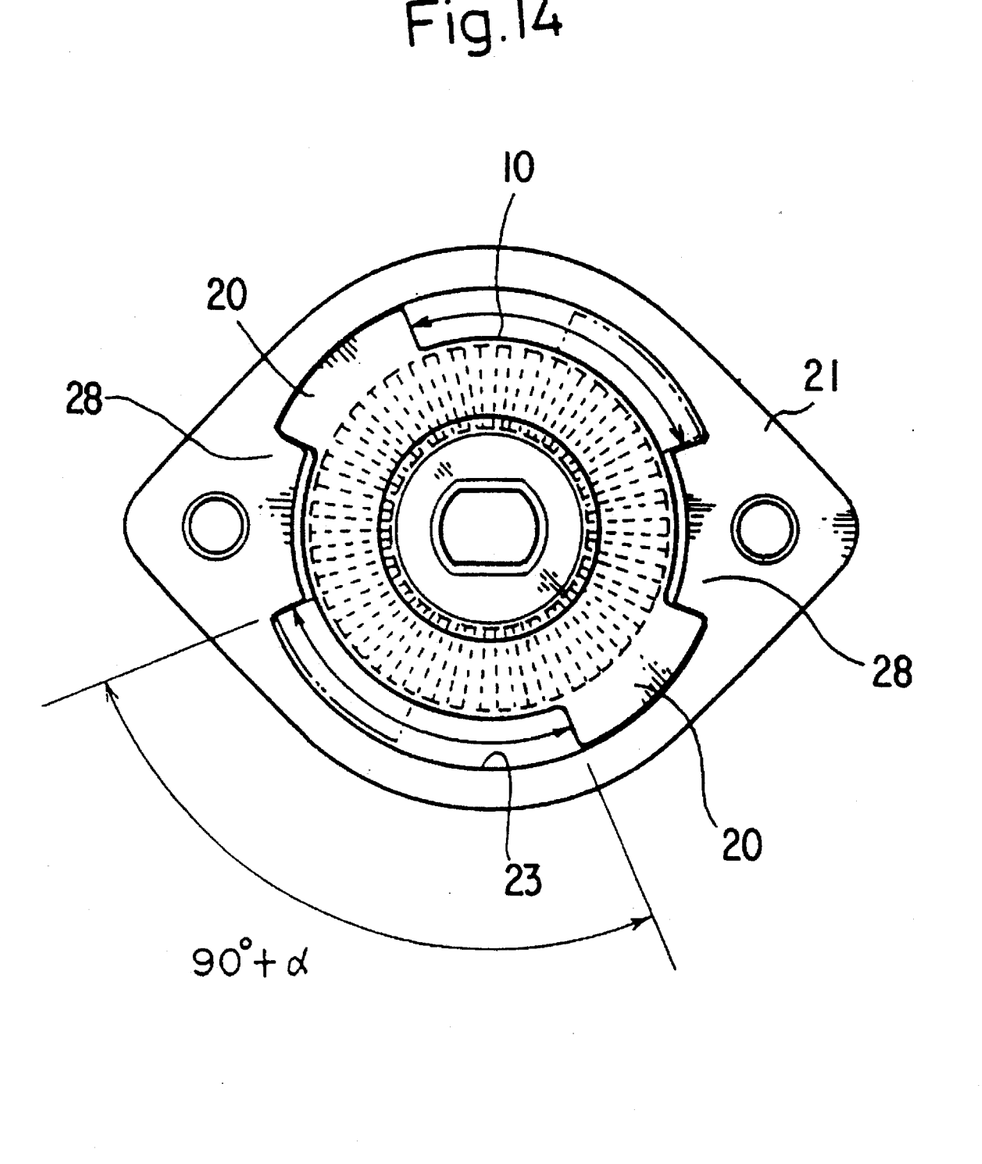
FIG. 14 is a bottom view where the notch plate and the casing is connected.

With reference to FIG. 12, a stopper receiver (28) is formed to project inwardly toward the inner surface of the central aperture (23). The receiver (28) is extending toward the inside of the central aperture (23) in the axial direction, and this receiver (28) is adapted to receive the stopper (20) at any time regardless of the axial movement of the notch plate (10). As shown in FIG. 14, the size between the inner diameter of the central aperture (23) and the outer diameter of the stopper (20) as well as the size between the outer diameter of the notch plate (10) and the inner diameter of the stopper receiver (28) is defined so that the rotation of the notch plate (10) can be freely obtained until the stopper (20) contacts onto the stopper receiver (28), when the notch plate (10) is built in the casing (21).

On the middle of the casing (21), a hole (29) is drilled to hold the cylindrical arbor portion (12), and the hole (29) is extending toward the outside. The circumferential suriace of the hole (29) is a boss-form, extending irom the surface of the casing (21) and becomes a cylindrical boss (30). As shown in FIG. 4, a cylindrical bottom portion (31) of the knob (14) is fitted tightly around the boss (31) so that this fitting can guide the rotation caused by the knob (14).

With reference to FIG. 4, 5 and 6, a spring (32) is prepared between the notch plate (10) over the clamping plate (7) and the washer plate (22), and this spring (32) constantly powers the notch plate (10) to the upward position. This powering ensures the correct engagement between the operative notch (15) and the fixed notch (24), whereby the engagement prevents the movement of the notch plate (10) and the knob (14). This engagement also promotes to hold the stem (5)

connected with the notch plate (10) at the fixed position, so that the valve (3) is maintained at the desirable position. In this embodiment, in order to power the notch plate (10) toward the upside, the coiled spring is adopted, but instead of the coiled spring, other members like leaf spring or elastic material, for example, rubber, can be also adopted therein.

The engagement between the operative notch (15) and the fixed notch (24) is attained by the tooth-like convex shape and the concave ditch wherein the sides of the convex shape are tapered, so that, even if the two notches (15,24) are contacted at improper spot, the adequate engagement can be attained by the pressurized power of the spring (32). When the combined notches are moved sidewise by the rotation of the knob (14) or the valve (3), the rectangle dimensions of the convex shape and the ditch provide a self-lock mechanism, and thus one notch does not move independently. This self-lock mechanism guarantees prevention of the random movement of the knob (14), so that the opening degree of the valve (3) can be held at the fixed position.

In this embodiment, the construction of the operative notch (15) and the fixed notch (24) is based upon the tooth-like convex shape and the concave ditch, but instead of this construction, the serration mechanism or the combination mechanism using the pin and the aperture is also adopted. In case of the serration mechanism, for the notch plate, the serration is furnished at regular interval on the disk surface. The width of the serration toward the outer diameter is formed larger while that toward the inner diameter is formed smaller, and the zenith of the serration is higher toward the outer diameter, while that toward the inner diameter should be in bowl-like sytle, like a conical shape upside down against the disk surface. Therefore, the standard surface for the serration should be formed lower toward the outer diameter and higher toward the inner diameter for the notch side, while, on the contrary, for the casing side, the standard surface should be higher toward the outer diameter and lower toward the inner diameter. In order to satisfy these conditions, the working process becomes complicated, and the total size is forced to become bigger. When the present embodiment is compared with the serration mechanism, the height of the tooth in the serrration mechanism is forced to be increased, which needs also increased stroke for the engagement or release. Thus, it is necessary to prepare longer and more powerful spring in place of the present spring (32) so that this device overcomes the increased stroke. When such longer or more powerful spring is used, the size of the device is compelled to become bigger.

For the serration mechanism, it is also feared that the release of engagement easily occurs by an unbalanced torque imposed on the valve because of changes of fluid pressure and fluid speed or by vibration. For the purpose of overcoming this unexpected release, it is also absolutely necessary to prepare much more powerful spring in bigger size. When such bigger and stronger spring is adopted ior the device, stronger manual power is needed to push down the knob (14), and the total size becomes bigger.

Figure 1:
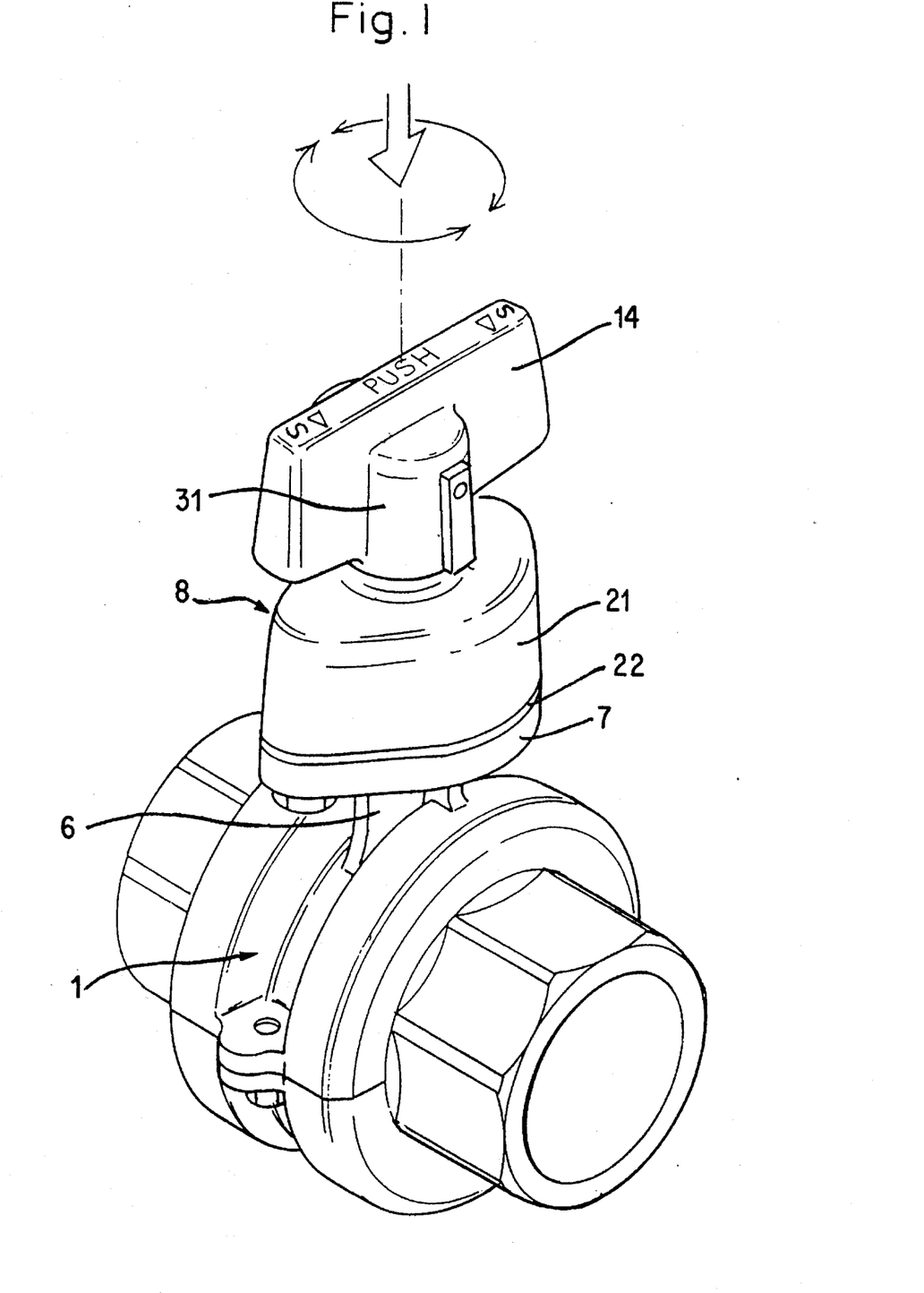
FIG. 1 is a perspective view of a device developed by the present invention.
Figure 2:
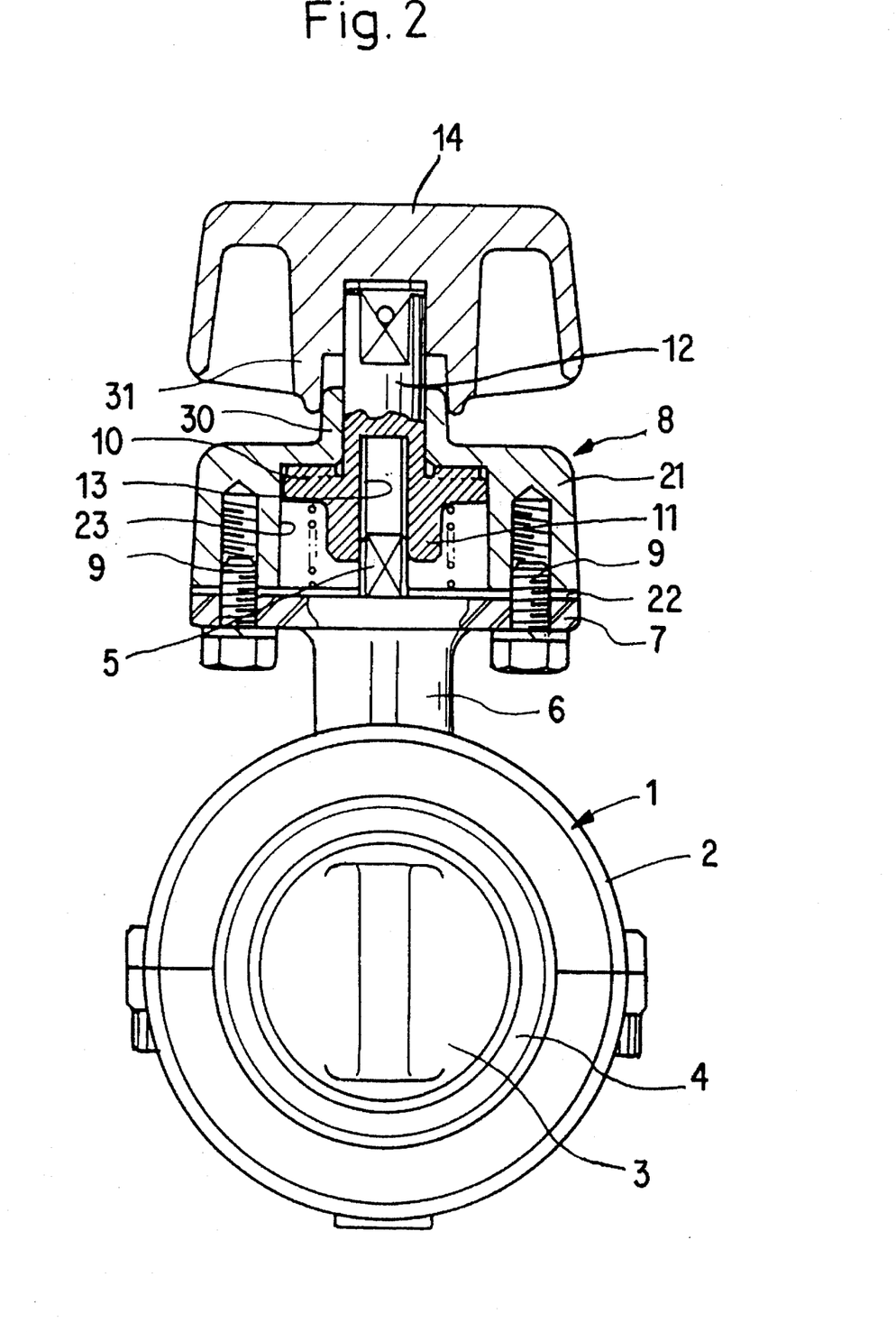
FIG. 2 is a front view of the device where it is cut down longitudinally.
Figure 3:
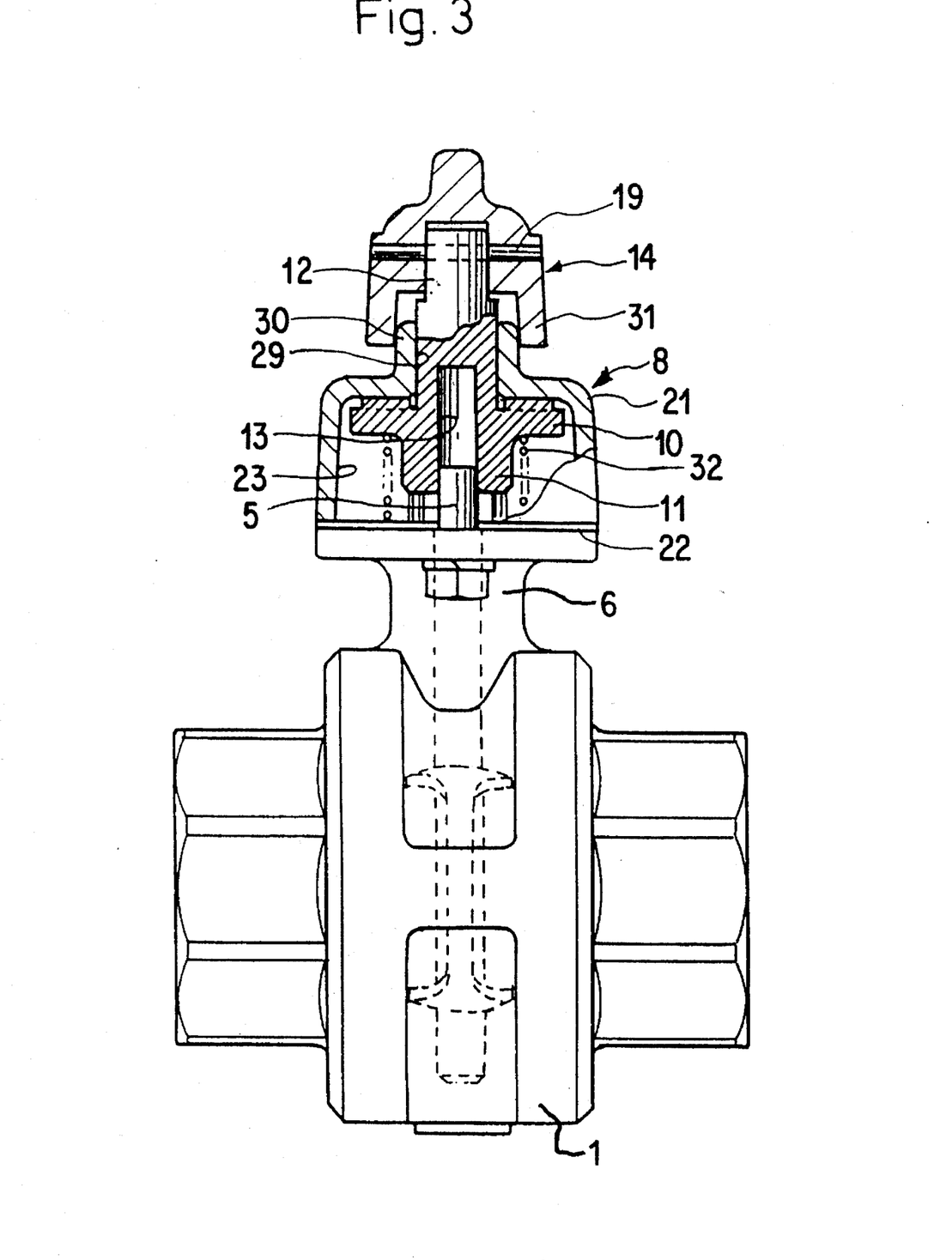
FIG. 3 is a side view of the device where it is cut down longitudinally.

With reference to FIG. 2 and FIG. 3, the notch plate (10) elevates by power of the spring (32), and thus the operative notch (15) and the iixed notch (24) engage tightly each other to be in a locked condition, and the valve is kept open to the desirable degree. In order to change the valve opening degree, as shown in FIG. 6, the knob (14) is pushed down against the spring (32) pressurization. When the knob (14) descends, the cylindrical bottom portion (31) of the knob (14) is fitted with around the cylindrical boss (30) and the operative notch (15) detaches from the fixed notch (24) so as to release the lock, and then the free rotation of the knob (14) is obtained. When the knob (14) is rotated, the notch plate (10) is synchronously rotated in correspondence with the knob (14) in the same direction via the cylindrical arbor portion (12). The stem (5) connected to the blind aperture (13) of the notch plate (10) is also rotated, which finally results in the rotation of the valve (3) at the desirable opening degree. When the power to push down the knob (14) is released, both of the notch plate (10) and the knob (14) elevate together and the locked condition is obtained by mutual engagement between the operative notch (15) and the iixed notch (24), and thus the desirable opening degree can be maintained constant.

With reference to FIG. 14, during the rotation of the knob (14), at the maximum opening point or minimum opening point, namely at the closing point, the stopper (20) contacts onto the stopper receiver (28), so that the overrun of the knob (14) is prevented and the excessive rotation of the valve (3) is avoided. In FIG. 14, the angle between the stopper (20) and the stopper receiver (28) is defined at 90 degrees+α. The both sides of the two notches(15,24) are tapered, so that the tooth-like convex portions (16,25) can be easily fitted or detached from each other. The angle of the taper is below 15 degrees, preferably at 7 degrees. When the taper angle is prepared in a larger angle, the mutual engagement is not sufficiently achieved, and therefore, the angle is to be defined as above.

Figure 19:
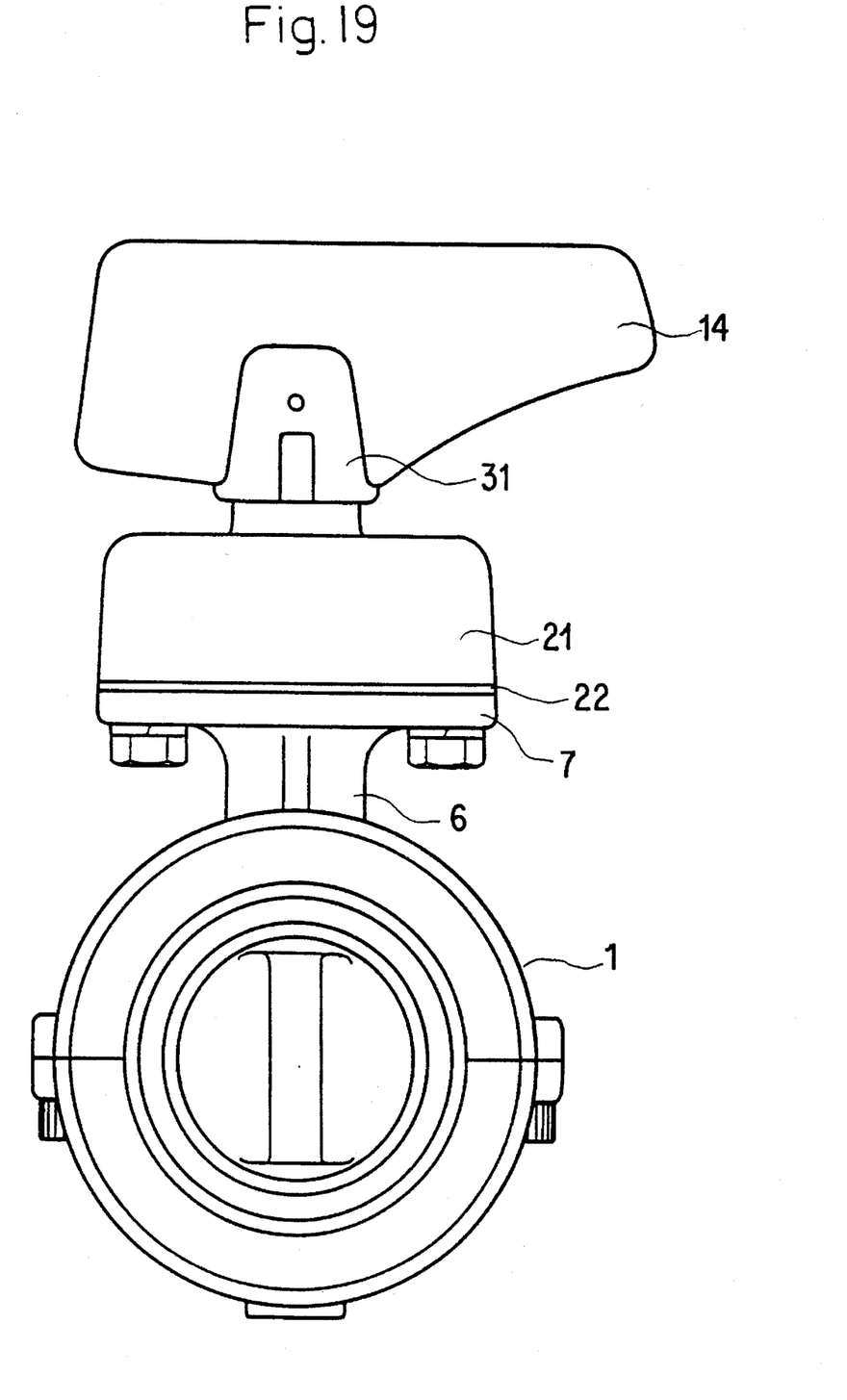
FIG. 19 is a front view showing a different embodiment of a knob.

FIG. 19 shows another modification of the knob (14). This modification is developed in order to operate the knob more smoothly in the device. It should be understood to those skilled in the art that such changes or variations may be made without departing from the spirit of the present invention.

What is claimed is:

1. In a valve having a movable valve opening member pivoted rotatably and positioned in a valve body for the opening and closing of a fluid passage, a manual device for the valve opening member comprising;

a notch plate slidably connected to one end of a stem which pivotably holds the opening member wherein the notch plate moves freely in the axial direction along a portion of the stem towards the valve and rotates synchronously with the stem;

a manually operative knob is secured to an upper portion of the notch plate extending exteriorly thereof for operating the valve member between open and closed positions;

a casing secured to an upper portion of the valve body wherein the casing contains the notch plate and guides the notch plate movement freely in the axial direction and guides rotation of the notch plate therein as the operative knob is moved axially and then rotated for moving the valve member towards either one of a valve open position and a valve closed position; and a notch means provided on an interior portion of the casing for preventing extra rotation of the notch plate when there is engagement between the notch plate and the interior casing wherein the notch plate is constantly pressurized within the casing to maintain engagement with the notch means when the operative knob is moved, the notch plate moves axially in a direction along a portion of the valve stem away from the valve member, and the notch plate moves the valve member to either one of valve open position and a valve closed position.

2. A device according to claim 1, wherein a stopper is provided on the notch plate and a stopper receiver is provided on the casing, so that the contact of the stopper with the stopper receiver prevents the overrun of the notch plate.

3. A device according to claim 1, wherein the notch means comprises:

a tooth-like convex shape which engages with a concave ditch, wherein sides of the convex shape are tapered toward its top, and a top width of the convex shape and bottom width of the ditch are provided in the same size to provide adequate engagement.

4. A device according to claim 3, wherein the tooth-like convex shape and the concave ditch extend radially outward, and the convex shape and the ditch are equally spaced circumferentially.

5. A device according to claim 1, further comprising a coiled spring for pressurizing the notch plate.

6. A device according to claim 1, wherein the valve is a butterfly valve comprising:

a valve body having an internal cylindrical fluid passage;

a movable disk valve rotatably pivoted and positioned in the valve body; and a seated ring made from elastic sealing material inserted between the valve body and the disk valve.

* * * * *